United States Patent [19]
Ames et al.

[11] Patent Number: 5,038,820
[45] Date of Patent: Aug. 13, 1991

[54] AUTOMATIC FLUID SHUTOFF SYSTEM

[75] Inventors: Philip L. Ames, 1978 Praymeadow Rd., Glenbrook, Nev. 89413; Alexander Prokop, Reno; Rainer R. Schulz, Sparks, both of Nev.

[73] Assignee: Philip L. Ames, Glenbrook, Nev.

[21] Appl. No.: 535,124

[22] Filed: Jun. 8, 1990

[51] Int. Cl.[5] ............................................. F16K 31/02
[52] U.S. Cl. ................................ 137/486; 137/495; 137/624.12; 137/487.5; 137/460
[58] Field of Search .................. 137/624.11, 624.12, 137/486, 499, 459, 460, 495, 487.5; 73/861.75, 861.76, 861.74

[56] References Cited

U.S. PATENT DOCUMENTS

| | | | |
|---|---|---|---|
| 2,037,575 | 4/1936 | Hamilton | 137/499 X |
| 3,085,432 | 4/1983 | Bloom | 73/861.75 |
| 4,249,563 | 2/1981 | Brust | 137/495 |
| 4,898,036 | 2/1990 | Gray | 73/861.74 |
| 4,911,200 | 3/1990 | Ben-Cirie | 137/486 |

Primary Examiner—Alan Cohan
Attorney, Agent, or Firm—Owen, Wickersham & Erickson

[57] ABSTRACT

An apparatus for automatically controlling the flow of fluid in an inlet conduit that provides the water supply for a home or building so as to prevent water damage due to a failure in the water system when unattended. The apparatus comprises a power circuit for supplying a low voltage DC power output which is connectable to a standard AC power source and includes an internal battery which operates in case of AC power failure. A flow sensor and a shutoff valve are connected in the inlet conduit. A control circuit which can be preset for different operational modes, receives and processes flow status signals from the flow sensor and provides output signals that control the shutoff valve, so that if continuous flow is detected in the conduit for a time period exceeding a preselected time, the shutoff valve will automatically close.

6 Claims, 5 Drawing Sheets

AUTOMATIC FLUID SHUTOFF SYSTEM

BACKGROUND OF THE INVENTION

1. Field of the Invention

The invention relates in general to an automatic shutoff system for a fluid supply and more particularly to means and methods for (1) detecting fluid movements (2) evaluating detected fluid movements according to predetermined criteria and (3) shutting off the system when undesired flow occurs.

2. Description of the Prior Art

The need for detecting leaks in plumbing systems and responding by closing shutoff valves has been widely appreciated. See for example U.S. Pat. Nos. 4,705,060, 4,518,955, 4,522,229 and 4,180,088. Undetected leaks may cause loss of valuable fluids conducted within the plumbing system, and the leaking fluid may cause extensive damages on the surroundings such as water damage or damage due to corrosion or even explosion.

Automatic shutoff systems heretofore devised experienced difficulty in detecting low volume fluid movement such as might occur due to a very small leak in the system. However, over a period of time, even small leaks may cause extensive damage. Accordingly, it became desirable to provide an effective low flow rate sensor in an automatic fluid shutoff system.

Another problem with prior art fluid shutoff systems arose with regard to providing ample power during normal power outages or failures. If a leak in the plumbing system occurred during an incipient power outage, shutoff systems of the prior art could not respond. Such power failures as well as plumbing system failures can be caused by the same catastrophic occurrence such as an earthquake, tornado, etc. Accordingly, it is necessary under such circumstances that an automatic fluid shutoff system incorporates a low voltage shutoff valve that is fully operable when energized by a low voltage battery. Moreover, it is desirable, if not essential, that a fluid shutoff system be fully operable with minimal power from a battery back up during periods of power outage and also be able to shut down the fluid plumbing system by means of the low voltage shutoff valve if and when the power failure continues past the life of the back up battery.

There are times when the plumbing system of a house or building is monitored and operated such as by a worker or homeowner but also there are times when the plumbing system is not monitored such as when the worker is called away or the home is vacant. If a fluid system malfunction or failure should occur in the absence of a monitoring person, serious damage and flooding could occur. Accordingly it is desirable to provide a highly sensitive means to automatically detect a malfunction and a lower power means to disconnect the fluid supply from the plumbing system. The shutoff should be accomplished within a predetermined time period of uninterrupted water flow when the plumbing system is monitored and within a relatively short time period of uninterrupted water flow when the plumbing system is not monitored by an operator or homeowner.

Accordingly, a general object of the present invention is to provide an automatic shutoff control system for a fluid or plumbing system that solves the aforesaid problems.

Another object of the invention is to provide a highly efficient and sensitive low flow rate sensor by a relatively small amount of power and thus in an automatic fluid shutoff system.

Another object of the invention is to provide a shutoff valve that is fully operable by a low voltage battey in the event of the loss of conventional house power.

Still another object of the invention is to provide an automatic fluid shutoff system that can be adjusted to accomplish system fluid shutoff within a longer period of uninterrupted water flow when the plumbing system is being monitored or to shut off the fluid supply within a relatively shorter predetermined period of uninterrupted water flow when the plumbing system is not being monitored by an operator or a homeowner.

Other objects of the invention are to provide a fluid shutoff system which can be easily installed with a minimum of tools and labor or which is durable and reliable; and one which is particularly well adapted for ease and economy of manufacture.

SUMMARY OF THE INVENTION

Briefly, the present invention comprises a new and improved automatic fluid shutoff system for detecting unwanted fluid flow in a plumbing system and for disconnecting the plumbing system from a supply source of pressurized fluid in response thereto. A sensor device provides a means for detecting fluid flow in the input conduit from a supply source to the plumbing system, which is capable of detecting small volume flow down to 0.25 gallons per minute (GPM). A low voltage control shutoff valve that is operable with low friction and low power requirements and thus is capable of being operated by a back up battery power supply in times of a conventional power failure is also connected in the input conduit. The flow sensor has a pivotal flapper disposed in the flow conduit and a sensing means for sensing the position of the flapper. When fluid flows in the flow conduit, the pivotal flapper rotates and moves to a position which is sensed by the sensing means which sends an electrical signal to a control processor. The control circuit evaluates the signals from the sensing means along with other representation criteria including frequency of sensed fluid flow, length of sensed fluid flow and whether the plumbing system is monitored or unmonitored. The control circuit then responds when necessary by providing an output that energizes the low voltage control shutoff valve. The control circuit is also fully operable by the backup battery power supply. The low voltage control shutoff valve of the invention includes a ball member in a housing with a diametral flow passage which is rotatable by a low power motor to be in either the open or closed position.

Other objects, advantages and features of the invention may be readily apparent, when considered in view of the following detailed description of exemplary embodiments, taken with the accompanying drawings.

DETAILED DESCRIPTION OF EMBODIMENT

Figure 1:
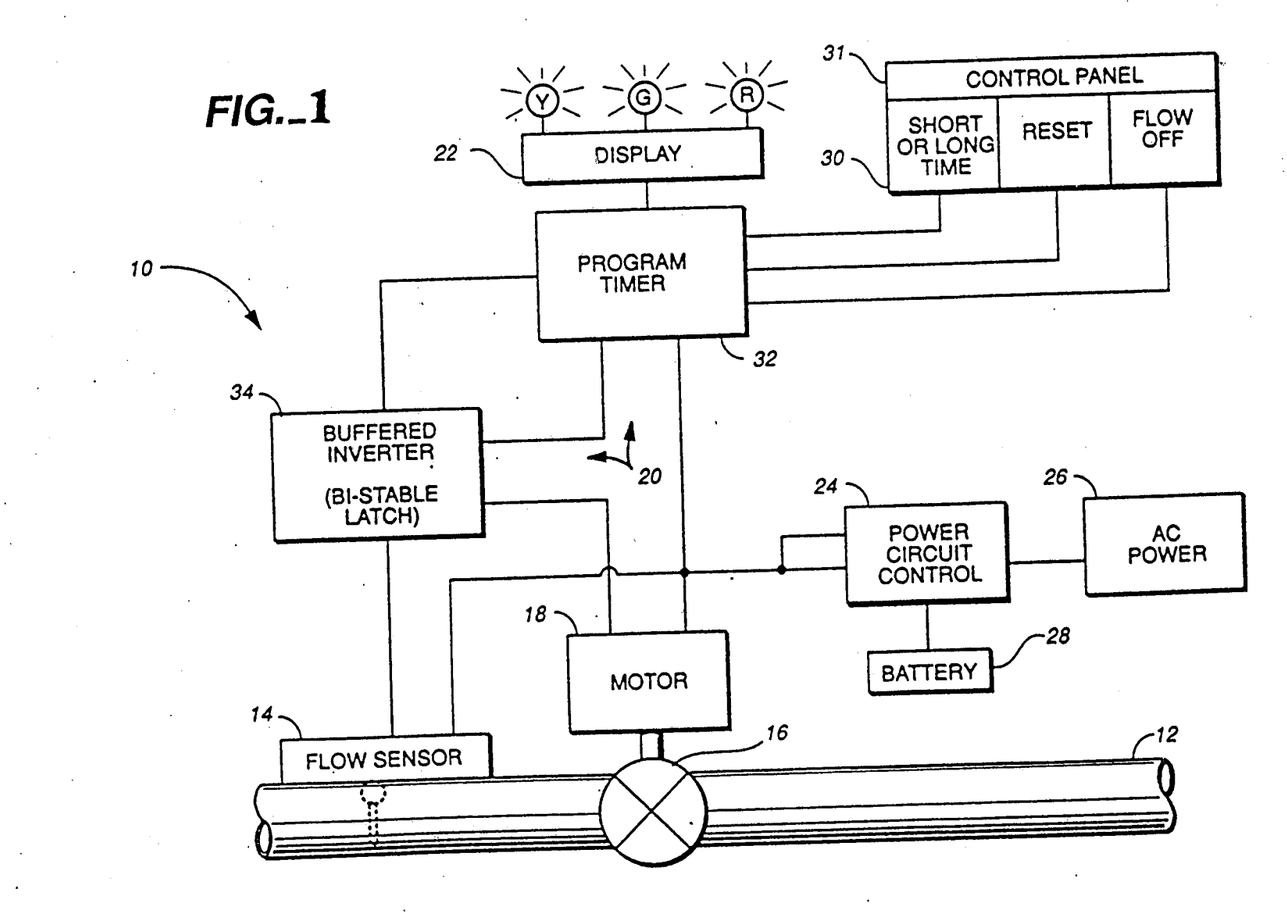
FIG. 1 is a schematic block diagram of an automatic shutoff system embodying features of the invention.

With reference to the drawing, FIG. 1 shows in block diagram form an automatic fluid shutoff system 10 embodying principles of the present invention. The system may be installed on a conduit 12 for a house or building which is connected to a fluid supply source such as a pump or a city water supply. In general, the system 10 comprises a flow sensor 14, a shutoff valve 16 connected to a valve motor 18, a control circuit 20 and a display monitor 22 that indicates present system conditions and has yellow, green and red lights. The circuit 20 includes a power conversion sub-circuit 24 connected to an AC power source 26 and including a battery power source 28. The power circuit supplies D.C. voltage to the motor and control circuit from either of the two alternative power sources. A switching means in the power circuit automatically produces power output from the battery source if for some reason the conventional AC power source is disabled. The control circuit 20 receives inputs from an occupant mode switch 30 on a control panel 31, as well as status inputs from the flow sensor and the motor. As described in greater detail below, the control circuit 30 comprises a pin controllable counter 32 which includes a real time clock in combination with a buffered inverter 34 which includes 6 inverters two of which provide a bi-stable latch. The control circuit functions generally to close the valve 16 in the conduit 12 automatically when it determines that water has been flowing in the conduit 12 for a predetermined period of time. The flow sensor 14 provides a first signal indicative of the water flow in conduit 12 which is furnished through the buffered inverter 34 to the pin controllable counter 32 which has been preset by the occupant mode switch 30 to provide a second signal indicative of whether or not the building is monitored by a person. Switch 30 may be a simple two-position switch that is operated by the occupant of the building which provides an input to the pin controllable counter. The valve 16 is coupled to motor 18 which receives power from the power circuit 24. The motor is responsive to a third signal to open valve 18 and to a fourth signal to close the valve. The buffered inverter 34 is representative of the means for generating the third and fourth signals which are provided to valve motor 18 at selected times in response to the stored first and second signals respectively stored in the pin controllable counter 32. Using these inputs, the control circuit 20 generates output signals for opening and closing the valve 16 as described below in greater detail. The control circuit 20 also provides output signals to the display means 22 to energize a green, yellow and red light respectively to detect when the system is operating with no water flow (Green); when the system is sensing water flow (Yellow); and when the system has shut off external water supply to conduit 12 by means of valve 16 (Red).

THE FLOW SENSOR

Figure 2:
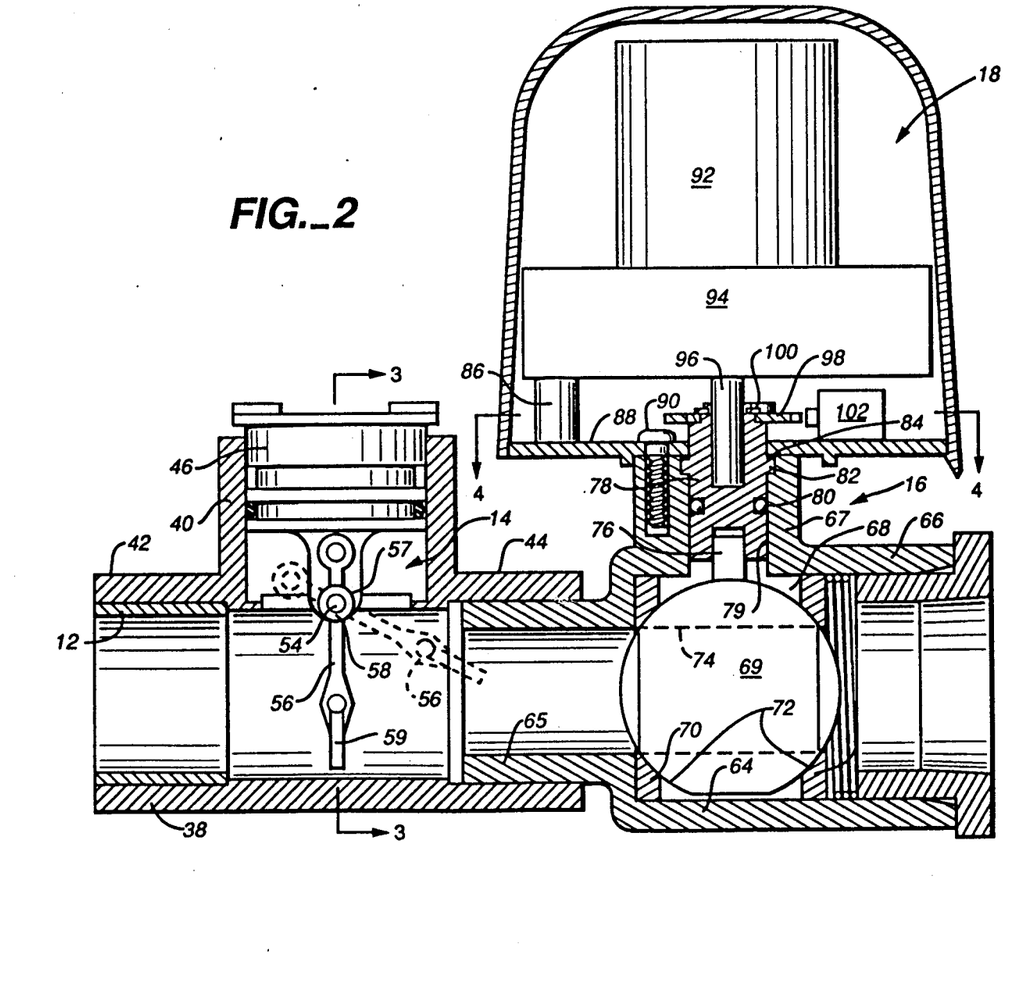
FIG. 2 is a cross sectional front view of a flow sensor and a shutoff valve for the system of FIG. 1, constructed according to the principles of the invention.
Figure 3:
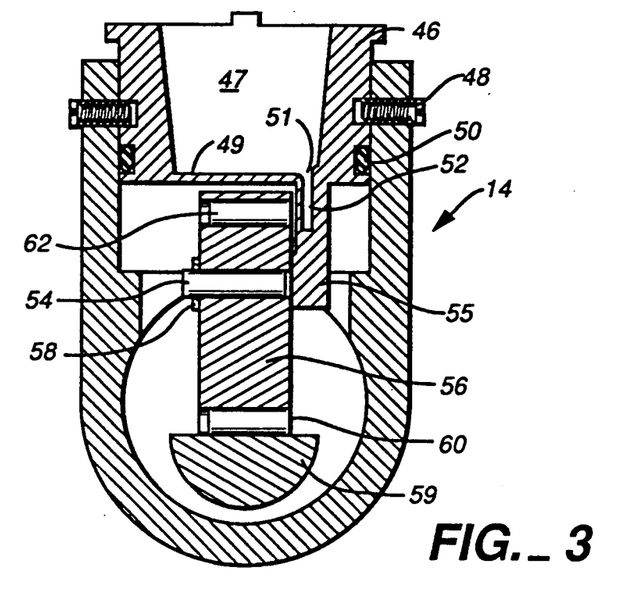
FIG. 3 is a view in section of the flow sensor shown in FIG. 2 taken along the line 3—3.

Referring to FIGS. 2 and 3, the flow sensor 14 in its preferred form is shown coupled to the shutoff valve 16. The sensor comprises a T-shaped housing 36 having a main tubular portion 38 and an upwardly projecting tubular portion 40. One end 42 of the main tubular portion is sized to fit around the conduit 12 from the water supply source and the opposite end 44 is adapted to couple directly with the valve 16, or if desired, with an extended section of conduit. Although the sensor 14 is shown directly adjacent to the valve 16 in FIG. 2, these components may be separated by conduit of any length, if desired. The T-shaped sensor housing 36 may be machined, cast or molded from any suitable metal or plastic material.

Situated within the upwardly projecting tubular portion 40 is a cylindrical insert housing 46 which is retained by a pair of set screws 48, as shown in FIG. 3. A groove at the lower end of the housing 46 retains a sealing O-ring 50. The housing 46 has a central recess 47 that forms a circular bottom 49 of substantially uniform thickness. Extending below one side of the bottom and integral therewith is a downwardly projecting member 55 which has a relatively narrow slot or pocket 51 whose upper end is open within the recess. Retained within this pocket is a "Hall effect" sensor device 52 of a type that is commercially available. The main functional characteristic of this sensor device is that it will produce an output signal when it comes within a magnetic field of a certain strength.

Extending at a right angle from the lower end of the projecting member 50 is a stud portion 54 which forms an axle means for a pivotal flapper 56. The flapper is an elongated relatively thin member of substantially constant width which extends downwardly into the space between opposite ends of the main tubular portion of the sensor housing. Near the upper end of the flapper is an integral tubular portion 57 which forms a bearing through which the axle stud portion 54 of the projecting member 50 extends with sufficient clearance to provide easy rotation. The flapper is retained on the stud portion 54 by a conventional snap ring 58 that fits on the end of the stud portion. As shown in FIG. 3, the flapper 56 has an enlarged portion 59 at its lower end to provide more area for water contact. Above the enlarged portion is a transverse metal dowell pin 60 which serves as a counterweight to urge the flapper into an upright, vertical position when no flow of water is occurring through the sensor. At the upper end of the flapper above the stud axle is a transverse cylindrical magnet 62. When the flapper is in its vertical, no-flow position, the magnet 62 is directly adjacent to the Hall effect sensor chip 52 thereby causing it to emit a no-flow signal to the control circuit 20.

In operation, when fluid flow as small as ¼ GPM occurs in conduit 12, flapper 56 moves off the rest vertical position, as shown, in phantom in FIG. 2, and displaces magnet 62 which is immediately sensed by magnet sensing means 52. Magnet sensing means 52 then sends a first signal representative of fluid flow over to the buffered inverter 34 (shown in FIG. 1). The control circuit 20 evaluates such first signals by means of predetermined parameters such as flow duration, and whether the plumbing system is monitored or unmonitored, etc. as will be described later by reference to FIG. 5, the detailed circuit diagram of the control circuit 20 for the invention.

THE SHUTOFF VALVE

The shutoff valve 16, as shown in FIG. 2, comprises a Tee-shaped housing 64 having a lower main section with aligned tubular inlet and outlet end portions 65 and 66 and a tubular boss portion 67 extending upwardly between them. Below the boss portion and between the end portions 65 and 66 is a compartment 68 within which is a rotatable ball 69. The ball is supported on its opposite sides for rotary movement within the compartment by a pair of spaced apart annular washers 70. Each washer has a curved inner surface 72 which is shaped to conform with the ball surface. Extending diametrically through the ball is a cylindrical passage 74 whose axis is aligned within the axis of the housing end portions 65 and 66 when the valve is open, and is perpendicular to it in the same plane when the valve is closed. Extending from the top side of the ball is a stud member 76 which is fixed to the lower end of a stem member 78 that is rotatable within a bore 79 within the boss portion 67 of the housing 64. The stem member has a clearance within the boss portion that provides low friction turning and it is sealed by an 0-ring 80 seated within a groove near the lower end of the stem. Near the upper end of the stem member is a peripheral flange 82 which is seated in a slightly larger circular cutout at the upper end of the base 79. On the upper annular surface of the flange 82 is a circular washer 84. The flange 82 serves as a means for precisely positioning the ball 68 within the compartment 68 of the valve housing, thereby causing it to be moved with minimum friction and thereby using a relatively low amount of power.

Extending above the stem member 78 is the motor assembly 18 which operates to turn the valve ball 68. The motor assembly is supported by a pair of posts 86 which are attached to and extend upwardly from a mounting plate 88. The latter is secured to the housing boss portion 67 by a machine screw 90. The motor assembly comprises a small DC motor 92 of any suitable commercially available type, whose output is provided through a reduction gear box 94 to an output shaft 96 which is drivingly connected to the upper end of the stem member 78.

Figure 4:
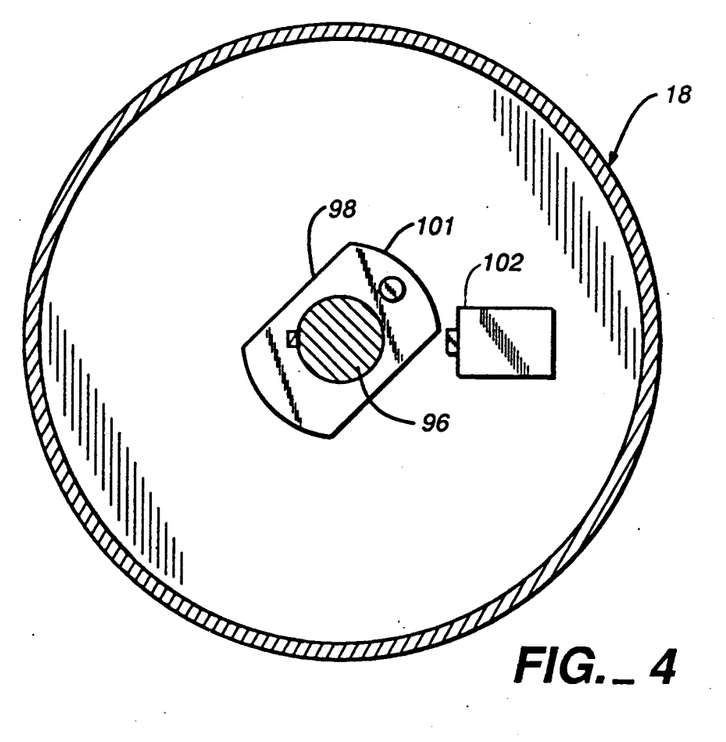
FIG. 4 is a view in section of the low voltage control shutoff valve shown in FIG. 2, taken along the line 4—4.

As shown in FIGS. 2 and 4, a cam member 98 is fixed to the upper end of the stem member and held in place by a snap ring 100. The cam member has curved camming surfaces 101 at its opposite diametral ends which are adapted to contact and depress a button switch 102 that is fixed to the mounting plate during 90° of rotation by the cam. The cam is positioned on the stem member so that the switch 102 is contacted and actuated for every 180° of rotation of the valve ball.

Thus, it is seen that the low power motor 92 operates always in one direction, only whenever it receives a turn-on signal, to rotate the valve ball 69 through 90° from either the open to close position or from the close to open position.

THE CONTROL CIRCUIT

Figure 5:
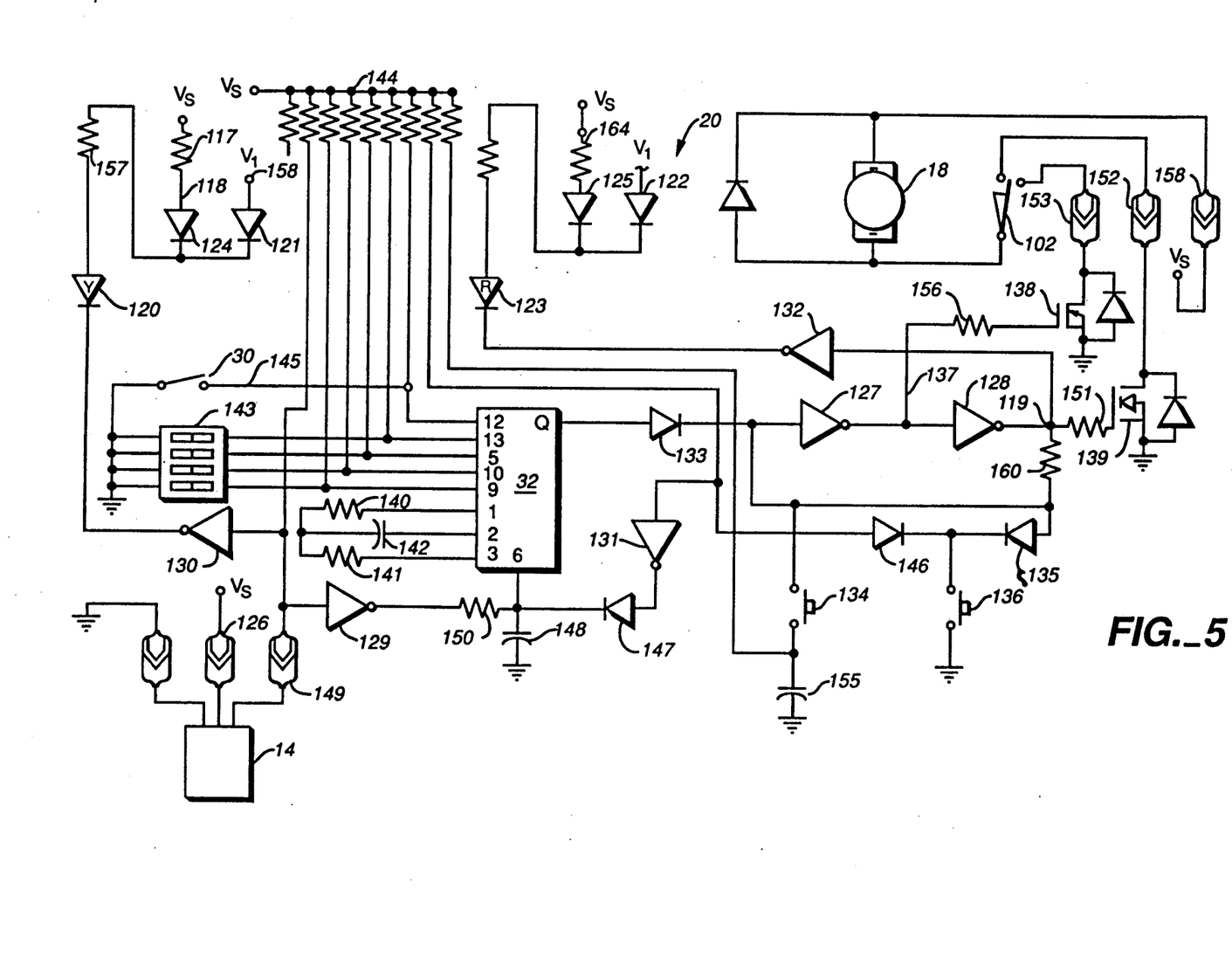
FIG. 5 is a detailed circuit diagram of the control circuit for the fluid shutoff system of FIG. 1.

Referring now to FIG. 5, there is shown a schematic diagram for the control circuit 20 constructed according to the teachings of the invention. Because this is basically a logic circuit system, voltage levels at junction points will be described using the common convention of "high" or "low" to denote the logic condition where a high indicates a voltage in a range near the supply and a low indicates a voltage in a range near the ground reference.

Figure 6:
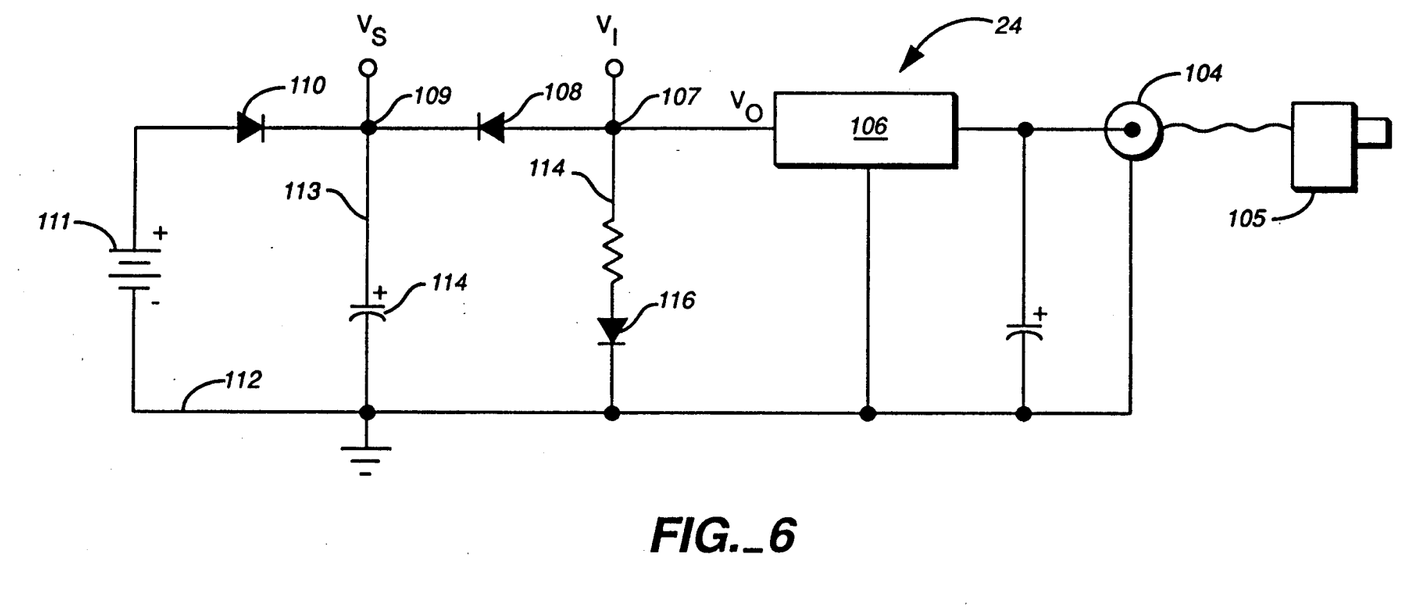
FIG. 6 is a detailed circuit diagram of the battery circuit for the fluid shutoff system of FIG. 1.

The control circuit operates normally using low voltage (e.g. 9–12 volts) DC, derived from standard house power (110 VAC) but if house power is lost for some reason, the system 10 will operate using standby battery power (e.g. 9–12 volts). The sub-circuit 24 showing the alternative power arrangement is shown in FIG. 6. An input jack 104 is provided which can receive a plug-in end of wire from a conventional AC to DC rectifier unit 105, of the type commonly used for portable electronic devices, which may plug into a standard 110 volt house socket. The rectifier thus converts the 110 volts to 9–12 volts D.C. and supplies it to the jack 104. Voltage from the input jack is furnished to an input ($V_1$ side of a standard regulator 106 (MC7812C) which functions to eliminate any surges that may be caused by the AC power source. The output ($V_0$) of regulator 106 is connected through a first junction 107 and through a diode 108 to a second junction 109. The first junction provides an output $V_1$ and the second junction provides an output $V_s$. The second junction is also connected through a diode 110 to the plus terminal of a battery 111 (e.g. 9 volts) whose negative side is connected to a ground lead 112. A third lead 113 from the second junction is connected through a capacitor 114 to ground, and a third lead 114 from the first junction 107 is connected to ground through a resistor 115 and a green LED 116 which provides a "power on indication". Thus, when the normal power source is lost, the green LED 116 will go out.

In operation, the power sub-circuit 24 functions to provide continuous power source from an AC plug even if the normal power source is disconnected. When 110 AC power is on, power is supplied through diode 108 and the second junction 109 to diode 110, causing it to be reversed biased and preventing current flow from the battery. Thus, power flows normally from the first junction ($V_1$) to the control reaches the diode 110, causing it to be forward biased and thereby allowing the battery to furnish power at the second junction ($V_s$). By providing the two alternative outputs, $V_1$ and $V_s$ from the power circuit, further conservation of power in the battery mode of operation is provided by causing the $V_s$ voltage in the control circuit 20 (FIG. 5) to pass through a large resistor 117, in an input lead 118 thereby reducing voltage to a yellow LED 120, which will still operate but with less power consumption.

Turning now to FIG. 5, the control circuit 20 will be described in detail. The $V_1$ and $V_s$ outputs from the power circuit are connected to various input terminals on the circuit. Thus, $V_1$ voltage is supplied at a main input terminal through a diode 121 to the yellow LED 120 and also through a diode 122 to a red LED 123. The $V_s$ voltage connections are separately connected through diodes 124 and 125 to the LED's 120 and 123 and also directly to the Hall effect sensor 14 through a junction 126. The functions of signal storing, processing and timing are provided by the CMOS oscillator and pin programmable counter 32 (IC 4541) which is used in conjunction with the hex-invertor 34 (IC 4049).

The hex inverter 34 is an integrated circuit consisting of six CMOS inverting buffer gates shown at 127, 128, 129, 130, 131 and 132 respectively, two of which, 127 and 128, are used as a bistable latch 34 whose primary output at a terminal 119 can be set (raised high) by a momentary high on the diode 133 input, a momentary closure of a red flow switch shown at 134 or cleared CLR (reset to low) by a momentary low on the input of CMOS inverting buffer gate 127 through the inverting buffer gate 128, a diode 135 and a switch 136 to ground. The bistable latch comprised of inverters 127 and 128 also has a complementary output through a lead 137 which is the inverse of the primary output 119 located on buffer gate 128. The purpose of this bistable latch is to act as a memory hold to maintain a signal to a pair of motor drive transistors 138, 139 in the event the time-out period signal or the Set or Reset buttons 134 and 136 change the state of the bistable latch before the motor 18 is able to complete the one quarter turn of the valve 16 as previously described. Two more of these inverting buffer gates, 130 and 132, respectively are used to drive yellow and red status indicator LED's shown generally at 120 and 123. The remaining two CMOS buffer gates 131 and 129 serve to control the reset pin 6 of integrated circuit 32.

The program timer 32 provides the set time out period, that is the time period of continuous water flow which can occur before a valve closing action is initiated. It has an on board clock oscillator whose frequency is determined by a pair of resistors 140 and 141 and a capacitor 142 connected to pins 1, 3 and 2 of counter 32. Pin Q of counter 32 provides the output of the internal logical counter chain.

On the counter 32, a pin 9 is grounded by a dual-in-line (DIP) switch 143 having four leads connected to ground. This sets the output normally low when the circuit counter is reset. A pin 10, grounded by the switch 143 sets a single cycle timing mode; A pin 5, grounded by the switch sets automatic power on reset; and a pin 13 provides a demonstration mode which is tied high by single incline package (SIP) resistor 144, sets a base divide module counter. A pin 12 is tied high by the SIP resistor and is connected to the occupant mode switch 30 in a lead 145 which, when open, selects a "short" interval in the counter 32 for situations where the house or building will be unoccupied and when grounded by closing switch 30, selects a "long" interval in the counter 32. The "short" time period may be as low as two minutes when the building is unoccupied, while the long time period may be more appropriately set for around two hours when the building is occupied.

In the assumed steady-state condition, a pin 6 in the counter 32 provides a reset input and is high because there is no flow of water holding back the start of a timing cycle. A high reset can be the result of the momentary closure of the reset switch 136 introducing a low to CMOS inverting buffer gate 131 by a path through SIP resistor 144, a diode 146 and switch 176 to ground. This produces a high at pin 15 of CMOS inverting buffer gate 131 forward biasing a diode 147 to the reset pin 6 of the integrated circuit counter 32. Also, a no flow sensor 14 condition at CMOS inverting buffer gate 129, produces a high at its output to charge a capacitor 148 CMOS eventually raising the voltage at the pin 6 of counter 32, which is thereby set high.

In the assumed no flow condition, the flow sensor 14 output indicated generally at junction 149 must be low, drawing a small current through SIP resistor 144, and the connecting inputs of inverting buffer gates 129 and 130 respectively are also low, causing their outputs to go high. With the output of inverting buffer gate 130 high, the yellow LED 120 is off, indicating a no flow water condition. With the output pin of inverting buffer gate 129 high, capacitor 148 is charged high through a resistor 150 raising the reset pin 6 of the integrated circuit counter 32 high. With pin 6 active, the Q output pin 8 of counter 32 is at a low (don't care) condition to the bistable latch 132 whose output at terminal 119 is low causing the input of inverting buffer gate 132 and a gate resistor 151 of the transistor 139 to also go low. A low on the input to inverting buffer gate 132 causes its output to go high and the red LED 123 to be off. A low on the gate resistor 151 of transistor 139 causes the latter to function as an open switch between a junction 152 and ground, and thus no motor current can flow to motor 18. Transistor 138 is the opposite of transistor 139 and functions as a closed switch to ground, but since the cam switch 102 path is open, no current can flow through a junction 153 to the motor 18. This results in the predominant steady state condition with no motor 18 or valve 16 change or action, i.e. water is available, the watchdog control circuit 20 is ready to time any flow period and to close the water valve 16 if the flow period exceeds the preset time out.

The manual flow-on momentary push button (Green) switch 136 is open and since the bistable latch is already in the clear mode, switch 136 could be closed with no circuit change.

The manual flow-off momentary push button 134 (Red) is open. When this button is pressed, a high charge on a capacitor 155 is applied to the input of inverting buffer gate 127 of the bistable latch 132 causing it to change the state of its output from the gate resistor 156 of transistor 138 and apply a high to a gate resistor 151 of transistor 139, causing the system to close the water valve 16 (FIG. 1) in the manner described later in this description.

Now, assume a change in the preceding steady state condition where due to a leak, a flush, or for some reason water now begins to flow in the incoming building conduit. Since we assume there is a water flow condition, the flow sensor 14 output must be high and the inputs to inverting buffer gates 129 and 130 respectively are also high causing their outputs to go low. With the output of inverting buffer gate 130 low, the yellow LED 120 now indicates a water flow condition by the electric current through a resistor 157, diode 121 and voltage terminal $V_1$ shown generally at 158 (FIG. 5). With the output of inverting buffer gate 129 low, capacitor 148 discharges through resistor 150, releasing the reset pin 6 of integrated circuit counter 32 120 to begin its timing cycle. With its reset pin 6 released, the integrated circuit begins a timing cycle and the output pin 8 will remain low until the internal counter's time out, unless the water flow condition halts, in which case inverting buffer gate 129 is reset again to wait for the next flow.

Now, assume at this point that the water continues to flow until integrated circuit 32 times out, i.e. its output pin 8(Q) latches high and passes a small current through diode 133, a resistor 160 and the output of inverting buffer gate 128. This raises high the input of inverting buffer gate 127 which causes the bistable latch 34 to change state and raises the input to inverting buffer gate 132 high as well as the gate transistor 151 of transistor 139, thereby simultaneously lowering the voltage level to the gate resistor 156 of transistor 138.

A high on the input of inverting buffer gate 132 causes its output to go low causing the red LED light 123 to indicate that a time out condition has occurred. A high on the gate resistor 151 of transistor 139 causes it to function as a closed switch between the junction 152 and ground, and thus motor current now begins to flow through the path input power jack 104 to a $V_s$ junction 158 to motor 18, through switch 102, junction 152, and transistor 139 to ground. This condition continues until the motor 18 causes a full one quarter turn of the water valve 18 and the associated cam switch 102 interrupts the above motor current to halt the rotation of the now closed water valve. The red LED light shown at 123 now indicates a closed water valve.

With the water valve closed, the flow sensor 14 output at junction 149 must go low, drawing a small current through SIP resistor 144 and the connecting inputs of inverting buffer gates 129 and 130 respectively, causing their outputs to go high. With the output of inverting buffer gate 130 high, the yellow LED light 120 is off, indicating a no flow water condition. With the output of inverting buffer gate 129 high, capacitor 148 is charged high through resistor 150, raising the reset pin 6 of integrated circuit counter 32 high. With the counter reset pin 6 active, its Q output is at a low (don't care) condition to the bistable latch 34 whose output pin 12 shown at 119 is still high including the input of the inverting buffer gate 132 and the gate resistor 151 of the transistor 139. This safety feature is the desired temporary condition in the event of a possible damaging household water leak.

The red LED indicator 123 and closed water valve 16 will remain so locked until noticed by the occupant who can then restore water service by pressing the green reset button 136 on the control panel. The occupant is thereby cautioned to shut off all water facilities and perform a careful search for a plumbing leak.

Pressing green switch 136 draws a small current through resistor 160 and diode 135 and lowers the input of inverting buffer gate 127 causing the bistable latch 34 to reverse its state. This lowers the primary output of inverting buffer gate 128 low connecting the gate resistor 151 of transistor 139 and also the input of inverting buffer gate 132, while raising high the complementary outputs of inverting buffer gates 127 and 128 respectively.

A low on the input of inverting buffer gate 132 causes its output to go high and the red LED 123 to go off. A low on the gate resistor 151 of transistor 139 causes the transistor to behave as an open switch between the junction 152 and ground, and thus no motor current can flow. Transistor 138 is in the opposite state and behaves as a closed switch to ground, since the cam switch 102 path is also closed, and motor current begins to flow through the junction 158, motor 18, switch 102, junction 153 and transistor 138 to ground causing the water valve to rotate one quarter turn until the associated cam switch 102 interrupts the motor current to halt rotation of the now open water valve 18. This results again in the predominant steady state condition, with no motor or valve change or action, i.e. water is available, the watchdog control circuit 20 is ready to time any flow period, and close the water valve if the period exceeds the preset time out condition.

Changing the occupant mode switch 30 to long or to short time duration by opening or closing it respectively changes the time out period only, and has no effect on the operation of the system sequences herein detailed.

As previously described, battery operation is included to provide temporary leak or floodwatch protection in the event of a loss of house power. To prolong battery operation, the system provides for a reduced indicator LED current drain while under battery operation. Under battery operation, DC electrical energy is supplied by the 9 volt battery 111 to diode 110 to the system circuit positive source or node $V_s$ and no energy gets to the node $V_1$. Consequently, the current path for both yellow and red LED's from the input $V_s$ must flow through the increased resistance provided by resistor 117 to the yellow LED 120 and through a resistor 164 to the red LED 123, resulting in less current being used by the two lamps.

Summarizing, the control circuit constructed according to the teachings of the invention and as depicted in the schematics of FIGS. 5 and 6, responds to preset operating parameters and external conditions according to the following conditions of operation:

1. Flow detector "flapper" is in the vertical position signifying no water flow. The circuitry senses the presence of the magnet and turns on the Green light, signifying that the system is operating and that no water is flowing. This condition also signifies that the AC power is also operating.
2. Flow detector "flapper" is not vertical, which signifies that water is flowing. Circuitry detects no magnetic presence and turns on the Yellow light. Both the Green and Yellow lights are "on" which means that the AC is on and that the system is operating and that water flow is detected.
3. Water flow has continued continuously until the preset time (time-out) has been reached. At this occurrence, the system reacts to a "leak" condition and turns the valve to the "OFF" position. The system also turns on the Red light.
4. If the homeowner wishes to turn the water back on, after the shut down procedure, he pushes the manual reset button which opens the valve and restores the system to either condition #1 or #2.
5. If the AC power goes off, the system immediately switches over to the battery backup and functions as in AC operation, except that the Green light will not be lit.
6. With no AC power, water flow detection is signified by the presence of a Yellow light, but no Green light.
7. If the preset time limit (time-out) is reached, in the absence of AC power, the battery will turn the valve to the "OFF" position and will show a Red light, but no Green light.
8. In the absence of AC power, the homeowner can reset the valve to the "ON" position, and if the batteries are in good condition, the system will return to condition #5 or #6.
9. If the AC is operational and no water flow is detected, the Green light will be lit. (Same as condition #1)
10. If the AC power goes out, and the system does not detect any water flow, or insufficient continuous water flow to reach the time-out limit, the system will continue to operate normally.
11. If the batteries are detected by the circuitry as being low, to the point that they will not be sufficiently charged to continue normal operations, the system will shut the valve with its remaining power, even though no "leak" condition has been detected. This prevents a leak, which occurs sometime after the batteries are too low to operate, from causing any damage.
12. If condition #11 has occurred, the homeowner cannot reopen the valve until a fresh power supply is introduced (either AC or new batteries).
13. If AC power subsequently comes back on, the homeowner can reopen the valve normally.
14., 15., and 16. If the system is allowed to operate with no batteries installed, or with dead batteries installed, no system operation is possible in the AC outage situation and damage from a leak can occur.
17., 18., and 19. If after conditions 14, 15, or 16 occur, AC power is reinstated and the system will operate normally as long as the AC power continues.

A. If the water flow which the system detects ceases, before the preset time (time-out) is reached, the system will return to condition #1, and reset the timing sequence to "zero". This is normal, non-leak, water usage in a home.

B. The system has two time-out periods, which are selectable by the homeowner depending on the status of the home. If the home is occupied, the longer (approximately 2 hours) time-out period should be selected. If the home is going to be vacant, the shorter (approximately 2 minutes) time-out period should be selected.

C. The system when it detects a long period of "pulsating" water flow (i.e. water on, water then off, then on, then off, etc.) will convert this into a "continuous" water flow condition, as far as the timing sequence is concerned, and will function accordingly. This condition is not normal and should be investigated by the homeowner. This condition could be caused by a washing machine which jams in an operating cycle and continues to pump water into the machine as the wash cycle repeats itself. Eventually, such a condition could cause water damage, and therefore the system is designed so that it will not be "fooled" by pulsing water flow, and will treat the entire period of pulsating flow as a continuous water flow.

From the foregoing, it should be apparent that the present invention provides a highly versatile, reliable and efficient automatic water shutoff systems for homes and buildings.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. An apparatus for controlling the flow of fluid in a conduit to a building and for automatically shutting off the flow under certain predetermined conditions, comprising:

power circuit means for supplying low voltage DC power;

flow sensor means adapted for installation in the conduit for sensing the flow of fluid therein and providing a first signal indicative of water flow;

a control circuit including means for sampling and storing said first signal;

means for preselecting a time period for continuous water flow in said conduit to provide a second signal;

program means in said control circuit including timing means for generating third and fourth signals in response to said first and second signals; and shutoff valve means for controlling the flow of water in said conduit located at a second position thereon and responsive to said third signal to open said valve and responsive to said fourth signal to close said valve, wherein said shutoff valve means comprises a housing adapted for connection with said conduit and a rotatable ball having a diametral flow passage, motor means connected to said ball for rotating it about an axis perpendicular to said flow passage, cam means rotatable with said ball, and a switch means located adjacent to and operable by said cam means for providing an output signal representative of the valve position.

2. The apparatus of claim 1 wherein said motor means comprises a DC motor connected through a gear means, and a stem means interconnecting said gear means and said ball.

3. The apparatus of claim 1 wherein said ball is supported by a pair of spaced apart circular members within said housing each having a beveled surface for supporting said movable ball for rotation with minimal friction.

4. The apparatus of claim 2 wherein said display means includes first, second and third color differentiated indicating lights which are activated in response to signals from said control circuit, and wherein said power circuit means includes means for operating said indicating lights on reduced current when said apparatus is operated on battery power.

5. An apparatus for controlling the flow of fluid in a conduit to a building and for automatically shutting off the flow under certain predetermined conditions, comprising:

power circuit means for supplying low voltage DC power;

flow sensor means adapted for installation in the conduit for sensing the flow of fluid therein and providing a first signal indicative of water flow;

a control circuit including means for sampling and storing said first signal;

means for preselecting a time period for continuous water flow in said conduit to provide a second signal;

program means in said control circuit including timing means for generating third and fourth signals in response to said first and second signals; and shutoff valve means for controlling the flow of water in said conduit located at a second position thereon and responsive to said third signal to open said valve and responsive to said fourth signal to close said valve, wherein said flow sensor means comprises:

a housing forming a second conduit and adapted for connection to said first conduit to place said first and second conduits in series;

a fluid impervious flapper, having substantially the same crossectional area as said second conduit, rotatably disposed in said second conduit;

positioning means for positioning said flapper such that in the absence of fluid flow through said second conduit, said flapper does not rotate and when there is fluid flow through said second conduit, said flapper rotates; and position sensing means for sensing the position of said flapper at all times and for generating a first signal representative of fluid flow whenever a position that indicates rotation of said flapper is sensed, wherein the positioning means includes said flapper having a lighter upper portion and a heavier lower portion to provide that the force of gravity will cause said flapper to come to rest in the vertical position in the absence of fluid flow through said second conduit.

6. An apparatus for controlling the flow of fluid in a conduit to a building and for automatically shutting off the flow under certain predetermined conditions, comprising:

power circuit means for supplying low voltage DC power;

flow sensor means adapted for installation in the conduit for sensing the flow of fluid therein and providing a first signal indicative of water flow;

a control circuit including means for sampling and storing said first signal;

means for preselecting a time period for continuous water flow in said conduit to provide a second signal;

program means in said control circuit including timing means for generating third and fourth signals in response to said first and second signals; and shutoff valve means for controlling the flow of water in said conduit located at a second position thereon and responsive to said third signal to open said valve and responsive to said fourth signal to close said valve, wherein said means for sampling and storing in said control circuit comprises an integrated hex inverter circuit including six inverters, two of which function as a bistable latch.

* * * * *